No. 857,903. PATENTED JUNE 25, 1907.
J. H. & H. S. PORTER.
AMUSEMENT APPARATUS.
APPLICATION FILED MAR. 15, 1906.
4 SHEETS—SHEET 1.
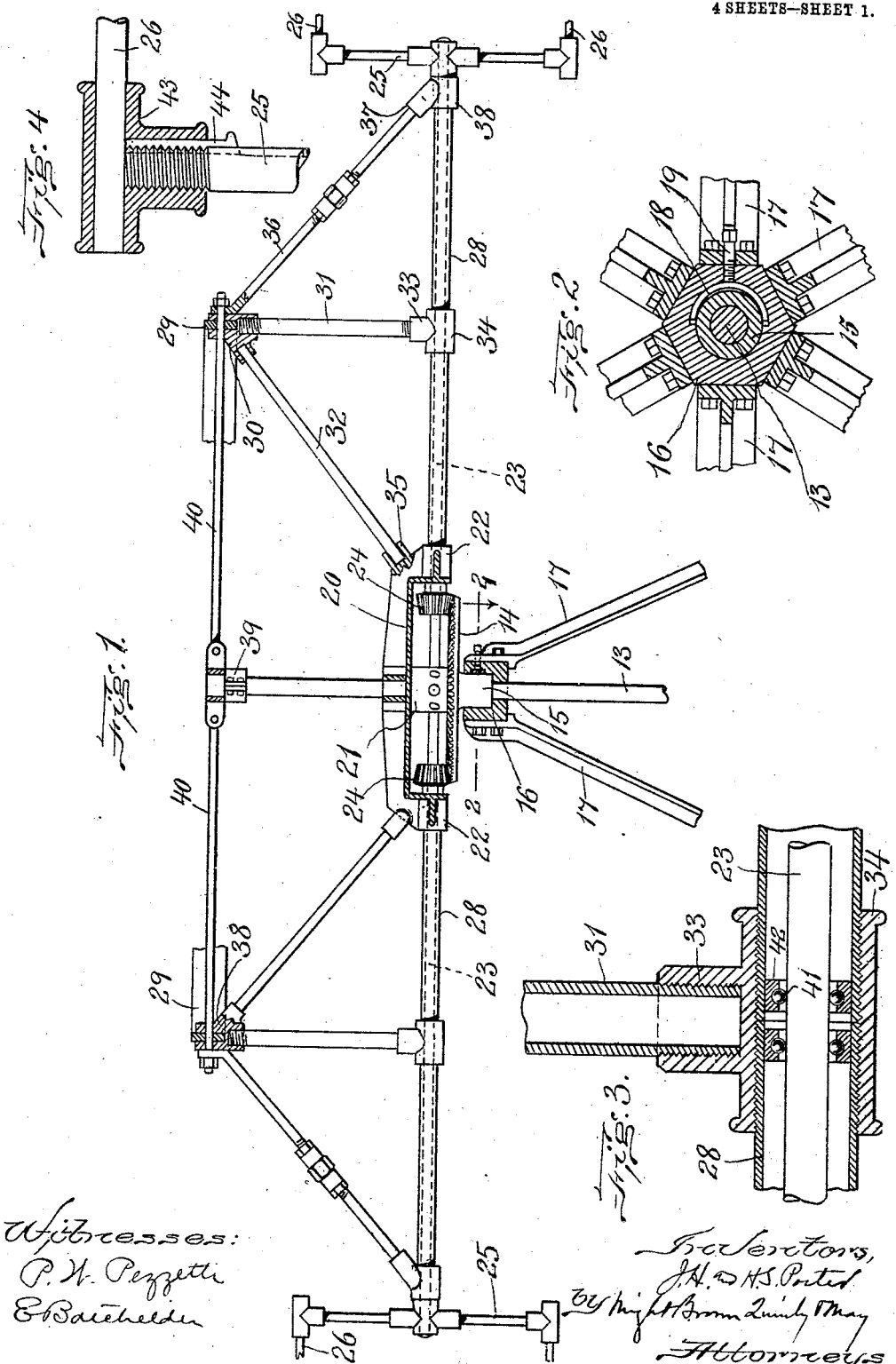

No. 857,903. PATENTED JUNE 25, 1907.
J. H. & H. S. PORTER.
AMUSEMENT APPARATUS.
APPLICATION FILED MAR. 15, 1906.
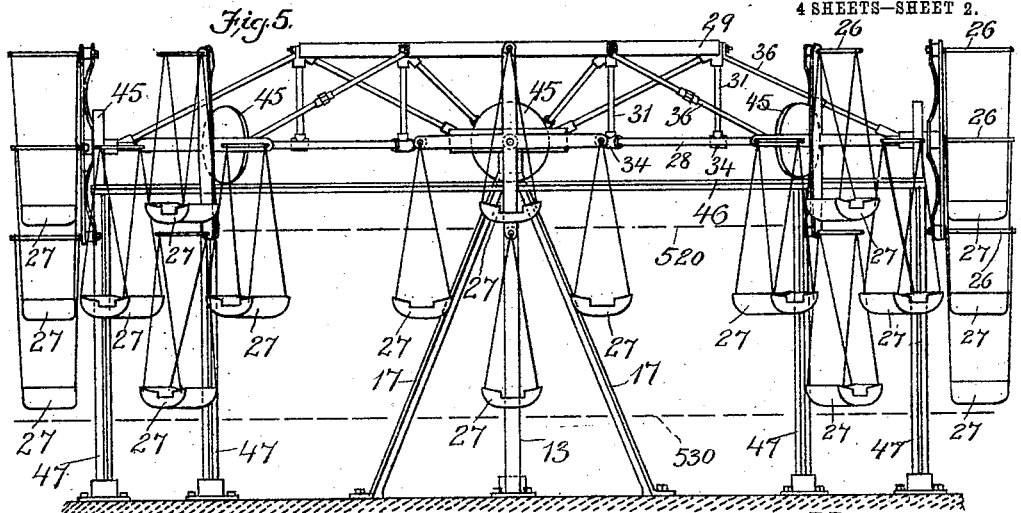
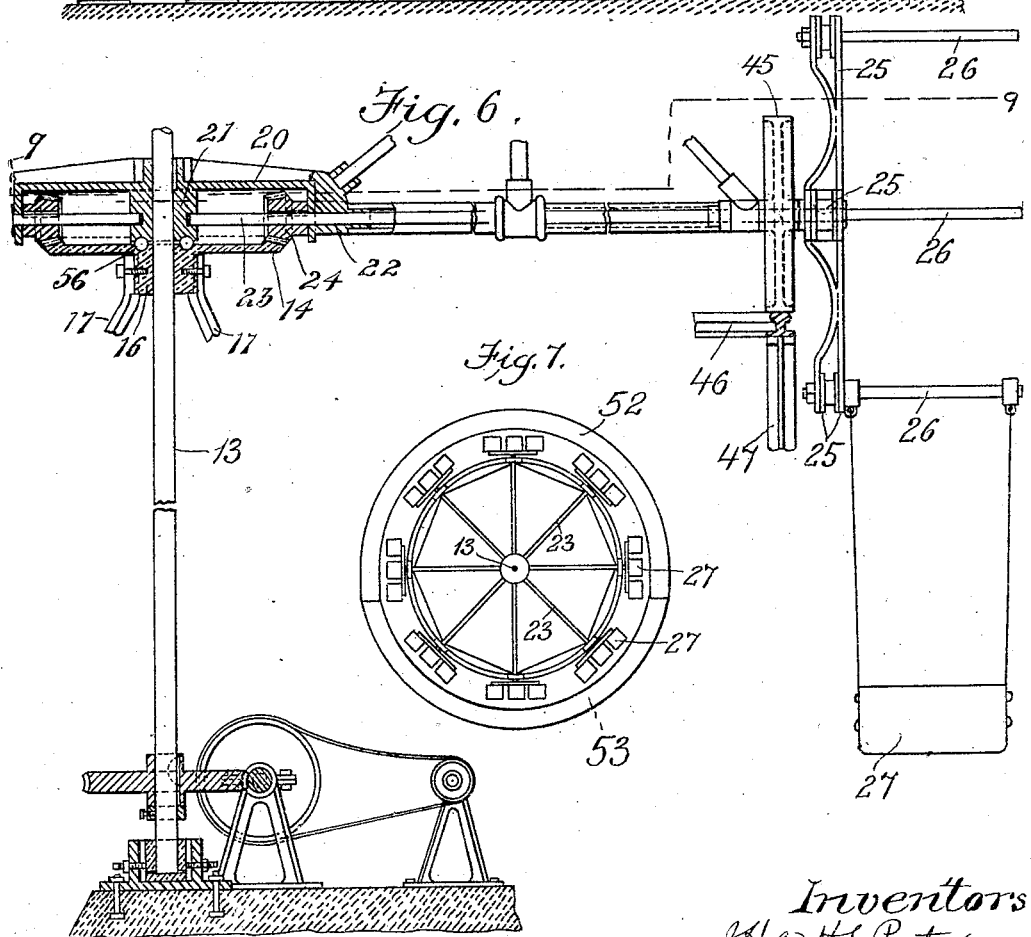

No. 857,903. PATENTED JUNE 25, 1907.
J. H. & H. S. PORTER.
AMUSEMENT APPARATUS.
APPLICATION FILED MAR. 15, 1906.

4 SHEETS—SHEET 3.

Witnesses.
Inventors
J. H. & H. S. Porter

No. 857,903. PATENTED JUNE 25, 1907.
J. H. & H. S. PORTER.
AMUSEMENT APPARATUS.
APPLICATION FILED MAR. 15, 1906.
4 SHEETS—SHEET 4.
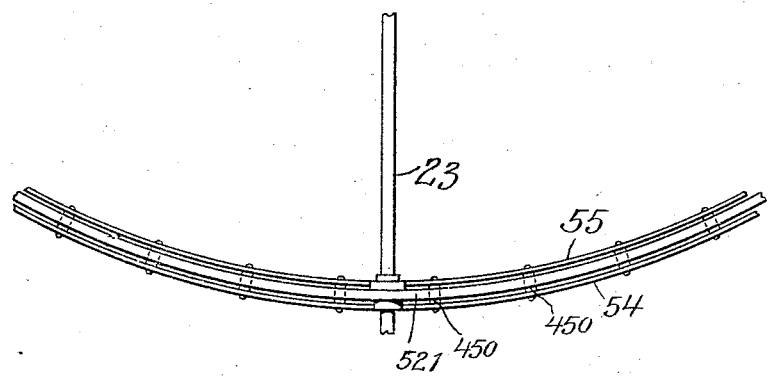
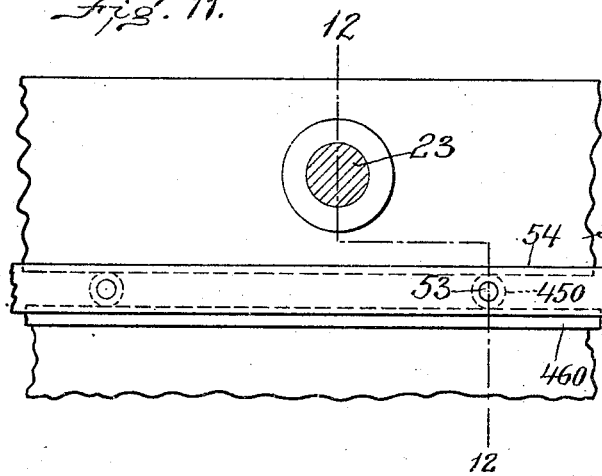
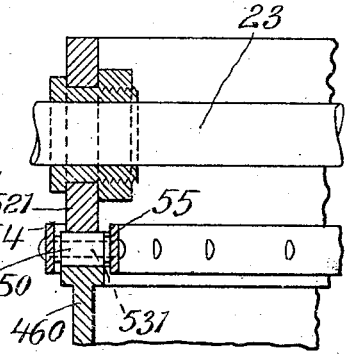

UNITED STATES PATENT OFFICE.

JAMES H. PORTER AND HENRY S. PORTER, OF BOSTON, MASSACHUSETTS.

AMUSEMENT APPARATUS.

No. 857,903.  Specification of Letters Patent.  Patented June 25, 1907.

Application filed March 15, 1906. Serial No. 306,203.

*To all whom it may concern:*

Be it known that we, JAMES H. PORTER and HENRY S. PORTER, of Boston, in the county of Suffolk and State of Massachusetts, have invented certain new and useful Improvements in Amusement Apparatus, of which the following is a specification.

This invention relates to amusement apparatus of the type in which a series of cars or seats for a number of riders rotate about a central upright, and particularly to an apparatus of this character in which the cars are caused to move in an undulatory path, resulting from a combination of a movement in a circular, horizontal plane and in a circular, vertical plane, as shown in Letters Patent of the United States #801,046, granted to us October 3, 1905.

The present invention has for its chief object to provide an apparatus in which the cars or seats are capable of the movements described in our former patent, and in which also the height of the supporting structure shall be reduced to the minimum.

The invention also has for its object to provide certain improvements looking to the strength, compactness, durability and efficiency of the apparatus.

The invention consists in the improvements which we will now proceed to describe and claim.

Figure 8:
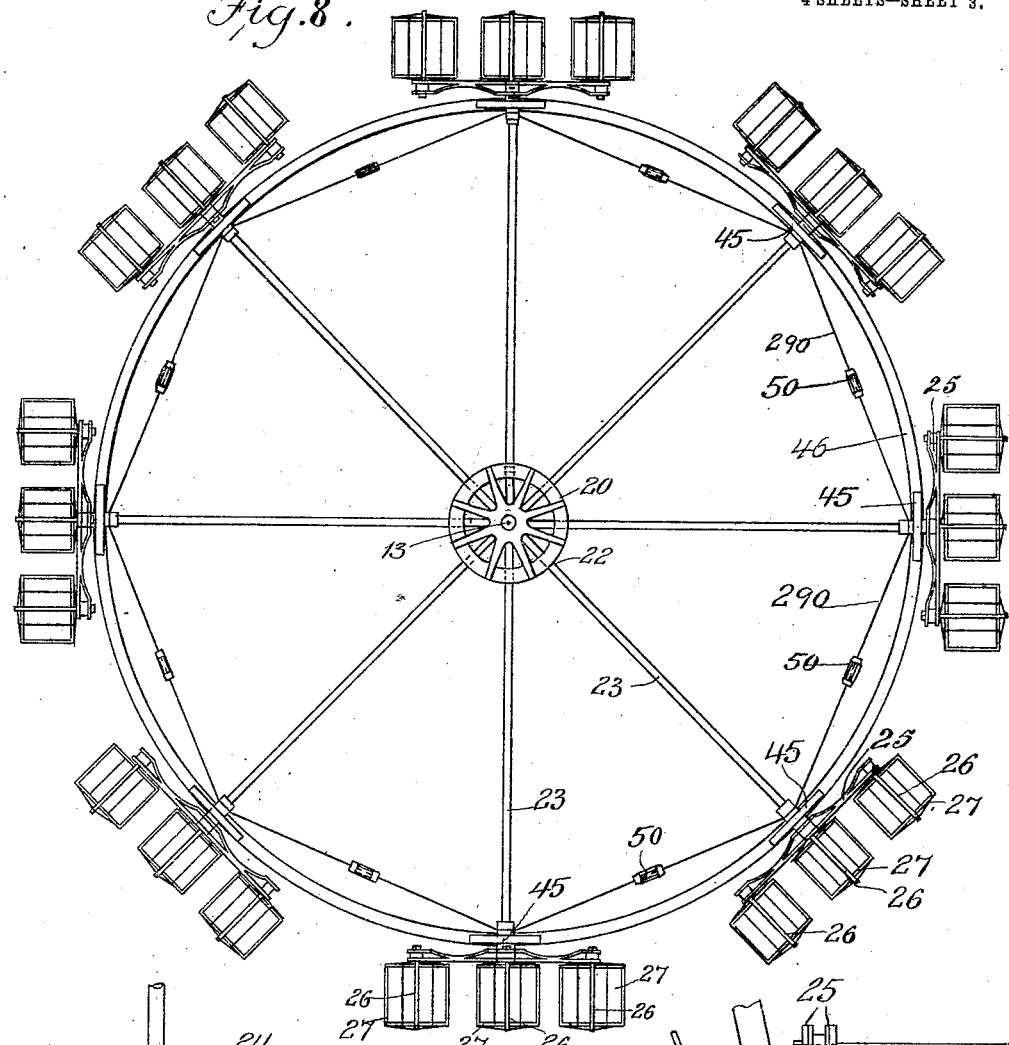
Figure 9:
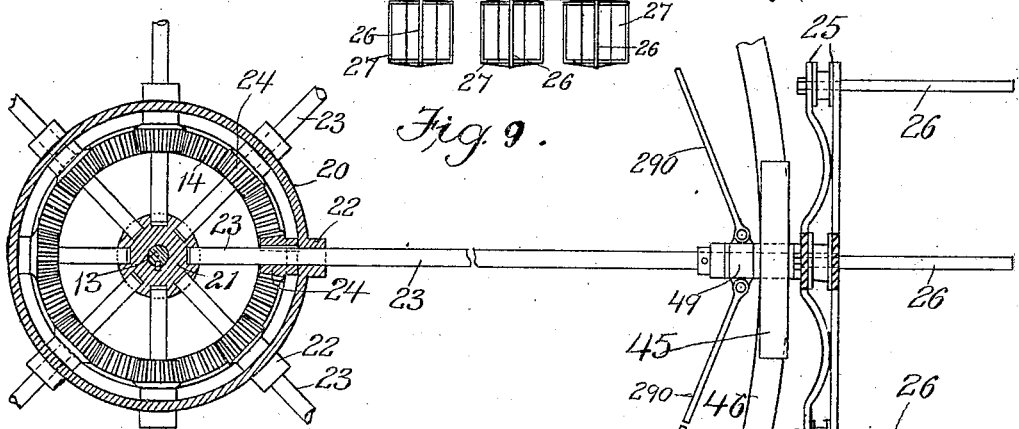

Of the accompanying drawings forming a part of this specification,—Figure 1 represents a side elevation partly in section, showing portions of an amusement apparatus embodying our invention. Fig. 2 represents a section on line 2—2 of Fig. 1. Figs. 3 and 4 represent sectional views of parts shown in Fig. 1. Fig. 5 represents a side elevation showing a structure which is provided with a circular track, supporting wheels mounted on the revolving portion of the apparatus. Fig. 6 represents a sectional view showing parts of the apparatus represented in Fig. 5. Fig. 7 represents a top plan on a reduced scale, showing an amusement apparatus embodying our invention, provided with a semicircular platform. Fig. 8 represents a top plan view of the construction shown in Fig. 5. Fig. 9 represents a section on line 9—9 of Fig. 6. Figs. 10 and 11 represent fragmentary views of portions of an apparatus embodying the invention. Fig. 12 represents a section on line 12—12 of Fig. 11.

The same letters of reference indicate the same parts in all the figures.

In the drawings, 13 represents an upright shaft, which may be rotated by power applied to it in any suitable way, such as by a motor, the power of which is applied through a worm gear meshing with a worm wheel affixed to the shaft, as shown in the above mentioned Letters Patent.

14 represents a bevel gear, which is adapted to be either held in a fixed position or to rotate with the shaft 13, the said gear having a hub 15, which encircles the shaft 13 and is journaled in a fixed bearing 16 supported by braces 17, the said braces and bearing constituting, in the embodiment of our invention shown in Fig. 1, the chief parts of the fixed supporting structure. The bearing 16 is provided with a clutch member 18, which is adapted to be moved by suitable means, such as a screw 19, into engagement with the hub 15, such engagement locking the hub to the bearing and preventing the rotation of the gear 14. When the clutch member 18 is retracted, the hub 15 is adapted to rotate with the shaft.

20 represents a spider, the central portion of which rests on a shoulder formed by a collar or enlargement 21, affixed to the shaft 13, the said spider having radial bearings 22, through which extend horizontally radiating shafts 23, the inner ends of which are provided with beveled gears 24 meshing with the gear 14. To the outer ends of the shafts 23 are affixed yoke frames 25, having horizontal arms 26, from which are suspended seats 27. Each yoke frame 25 has four arms 26 and four seats 27, each suspended from one of said arms, the arrangement being substantially the same as that shown in the above mentioned patent.

In the construction shown in Fig. 1 the shafts 23 and the yoke frames and seats carried thereby are supported by means of a trussed supporting frame constructed as follows: 28—28 represent sleeves or tubular extensions of the bearings 22, such extensions extending from the bearings 22 to the hubs of the yoke frames 25. 29 represents a continuous ring or band located above the bearings 28 and provided at intervals with fittings 30 having sockets which receive the upper ends of vertical truss rods 31 and inclined truss rods 32. The lower ends of the rods 31 and 32 are engaged respectively with sockets 33, affixed to sleeves 34 embracing the bearings 28, and with inclined sockets 35 formed on the spider 20. The fittings 30 are connected, by inclined truss rods 36, with sockets 37 formed on sleeves 38, which embrace the outer portions of the bearings 28. The shaft 13 is extended above the spider 20, and its upper end is provided with a collar 39 having ears which are connected by horizontal rods 40. with the ring or band 29.

The above described construction provides a strong and durable support for the radiating shafts 23 and absolutely prevents any springing or buckling of said shafts under the strains to which they are subjected by the seats 27 and their loads.

The sleeve bearings 28 may be provided with ball bearings 41 Fig. 3 held in cages 42 and supporting the shafts 23, as shown in Fig. 3. The seat supporting arms 26 of the yoke frames are preferably affixed to angular sockets 43 which are affixed to the radiating arms of the yoke frames by keys 44 entering key-ways in the said radiating arms, as shown in Fig. 4. This construction provides a secure connection between the arms 26 and the yoke frames.

It will be seen that when the horizontal, bevel gear 14 is held from rotating and the shaft 13 and spider 20 are rotated, the gears 24 are caused to rotate by their engagement with the fixed gear 14, so that the gears 24 and the shafts have a planetary motion, the yoke frames being revolved on their own axes. The seats 27 are thus moved in an undulatory path, as in the apparatus shown in our former patent.

The trussed supporting frame above described occupies relatively little vertical space above the radiating shafts, so that the height of the structure, as a whole, is very much less than would be the case if the shafts were supported by guy rods radiating downwardly from a central support as heretofore.

In the construction thus far described, the outer portions of the radiating shafts, the yoke frames and the seats are supported against downward movement wholly by the trussed supporting frame. In Figs. 5 and 6 we show a construction in which each of the shafts 23 is provided with a traction wheel 45, the said wheels 45 running on a fixed circular track 46 supported by uprights 47, the track being concentric with the shaft 13. In this construction any tendency of the shafts 23 to spring or buckle between the wheels 45 and the spider 20 may be counteracted by a trussed supporting frame of substantially the construction shown in Fig. 1, although in this case the members of the supporting frame may be much lighter than those shown in Fig. 1, owing to the additional support afforded by the track 46 and wheels 45.

In this lighter construction the ring or band 29 may be composed of a series of rods or rod sections 290, attached to ears on collars 49 surrounding the outer portions of the shafts 23 and connected between the shafts by turnbuckles 50.

In Fig. 7 we show a semi-circular platform 52, partially surrounding the apparatus and elevated so that its supporting surface will be at a proper height to permit passengers to enter seats 27 which are at the highest points in their orbits. A suitable height of the supporting surface of the platform 52 is indicated by the dotted line 520 in Fig. 5, where the seat carrying yoke frames are shown with two opposite seats in a vertical plane and the other two seats in a horizontal plane. The upper seats are now in position to be conveniently entered from the platform 52, while the lower seats are in position to be conveniently entered from a lower platform 53, which may be the floor or base on which the apparatus as a whole is mounted, or a platform raised somewhat above the said floor, as indicated by the dotted line 530 in Fig. 5. The cars which are located in a horizontal plane are now inaccessible from either platform, the only cars that are accessible to the passengers being those arranged in a vertical plane. Before the other cars can be loaded, the yoke frames must be turned a quarter rotation, thus bringing the empty cars into a vertical plane, and the loaded cars into a horizontal plane. Provision is thus made for loading and unloading the cars without undue strain on the shafts 23 and other parts of the apparatus.

It will be observed that the upper and lower platforms are at opposite sides of the axis of rotation, so that the load taken from the upper platform and the load taken from the lower platform will counterbalance each other to the extent required to permit the rotation of the apparatus as a whole with the minimum expenditure of power. We find, by practical experience, that by loading the seats from two platforms, one coinciding with the highest seats and the other with the lowest, the said platforms being at opposite sides of the center of rotation, we are enabled to operate the apparatus with about one-tenth of the power that would be required if all the seats were loaded from one platform or from the same level.

In Figs. 10, 11 and 12 we have shown supporting means as a substitute for the track 46 and wheels 45, and intended to operate with less noise than the said track and wheels. In this embodiment of our invention, 460 represents a fixed circular track substituted for the track 46, and 521 represents a ring connected with the bearings of the shafts 23. The lower edge of said ring rests upon a series of rollers 450, which constitute substitutes for the wheels 45 and are rotatable on pins or axles 531, supported by concentric rings 54 55, between which the rollers 450 are located. The horizontal movement of the shafts 23 causes the ring 521 to rotate upon the rollers 450, the latter rolling with a slow, circular motion upon the fixed track 460. This contrivance will materially diminish the noise attendant upon the operation of the apparatus and therefore greatly improve its desirability.

As above described, the spider 20 rests on a collar or enlargement 21 secured to the shaft 13. As shown in Fig. 6, anti-friction balls 56 are mounted between the under surface of said enlargement and the upper surface of the fixed bearing 16 which is supported by the braces 17. This anti-friction bearing supports the weight at the center and insures smooth and easy running. It will be seen that the step 16, which supports the weight of the shaft 13 and its attachments, is elevated so that it is in close proximity to the spider 20 and to the horizontal plane of the radial shafts. It will also be seen, by reference to Fig. 6, that the anti-friction bearings 56 are supported by the elevated step 16, so that they are also in close proximity to the spider and the plane of the radiating shafts. Owing to this elevated location of the step and the anti-friction bearings, pressure on the bearings at one side of the shaft, caused by an unequal distribution of the load, is reduced to the minimum, and is prevented from crushing or injuriously affecting the balls of the anti-friction bearings. In Letters Patent #801,046, granted to us October 3, 1905, the step which supports the weight of the vertical shaft is located at the extreme lower end of said shaft, so that any tendency to tilt or throw the shaft slightly out of plumb, caused by an unequal distribution of the load, will cause a crushing pressure to be exerted on the balls which rest upon the step. This objection is removed by the elevation of the step and the anti-friction balls.

We claim:

1. An amusement apparatus comprising an upright central driving shaft, means for supporting the same, a frame or spider affixed to said shaft and having horizontal shaft bearings, a trussed supporting frame having shaft bearings at its outer portions said trussed frame being engaged with the spider, and horizontal shafts supported in said spider bearings and truss-frame bearings and having seat supporting yoke frames at their outer ends.

2. An amusement apparatus comprising an upright central driving shaft, means for supporting the same, a frame or spider affixed to said shaft, elongated tubular bearings affixed to and radiating from the spider, a horizontal ring or band above the said bearings, inclined truss members connecting the said ring with the spider, inclined truss members connecting the ring with the outer portions of the elongated bearings, intermediate truss members connecting the ring with the central portions of the elongated bearings, radially arranged rods connecting the ring with the upper portion of the vertical shaft, radially arranged horizontal shafts in said elongated bearings, and seat-supporting yoke frames affixed to the outer portions of said horizontal shafts.

3. An amusement apparatus comprising an upright central driving shaft, means for supporting the same, a series of horizontal shafts radiating from the upright shaft, and provided at their outer ends with seat-supporting yoke frames, bearings for said horizontal shafts connected with the upright shaft, a driving gear normally loose on the upright shaft and meshing with gears affixed to the horizontal shafts, and means for locking and releasing said driving gear.

4. An amusement apparatus having radiating shafts, yoke frames mounted on the outer ends of said shafts and comprising radial arms, having angular sockets keyed to their outer ends and horizontal arms affixed to said sockets.

5. An amusement apparatus comprising an upright driving shaft, a series of horizontal shafts radiating therefrom and operatively connected therewith, said shafts having seat-supporting yoke frames at their outer ends, sleeves inclosing portions of said shafts, trussed frames connected with said sleeves whereby said shafts are prevented from springing or buckling, and means for supporting the outer portions of said horizontal shafts, said means including a fixed circular track and wheels or rollers movable thereon.

6. An amusement apparatus comprising an upright driving shaft, a series of horizontal shafts radiating therefrom and operatively connected therewith, said shafts having seat-supporting yoke-frames at their outer ends, and means for supporting the outer portions of said horizontal shafts, said means including a fixed circular track, a ring affixed to the bearings of the shafts above the track, and an independently rotatable circular frame having a series of rollers interposed between the said ring and track.

7. An amusement apparatus comprising an upright driving shaft, a series of horizontal shafts radiating from the upright shaft and operatively engaged therewith, said horizontal shafts having seat-carrying yoke-frames, and segmental platforms located at different heights, said platforms being at opposite sides of the upright shaft.

8. An amusement apparatus comprising an upright central driving shaft, having an elevated collar or enlargement, a spider supported on said enlargement, horizontal shafts radiating from the spider and having seat-supporting yoke frames at their outer ends, a fixed elevated step surrounding the shaft in close proximity to the said enlargement and spider, and anti-friction bearings interposed between the enlargement and the step, the elevation of the step preventing crushing pressure on the anti-friction bearings.

In testimony whereof we have affixed our signatures, in presence of two witnesses.

JAMES H. PORTER.
HENRY S. PORTER.

Witnesses:
C. F. BROWN,
E. BATCHELDER.